United States Patent
Kamatsuka

(10) Patent No.: US 9,841,957 B2
(45) Date of Patent: Dec. 12, 2017

(54) APPARATUS AND METHOD FOR HANDLING REGISTERS IN PIPELINE PROCESSING

(71) Applicant: FUJITSU LIMITED, Kawasaki-shi, Kanagawa (JP)

(72) Inventor: Shun Kamatsuka, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/132,815

(22) Filed: Apr. 19, 2016

(65) Prior Publication Data

US 2016/0328236 A1 Nov. 10, 2016

(30) Foreign Application Priority Data

May 7, 2015 (JP) .................................. 2015-094547

(51) Int. Cl.
G06F 9/45 (2006.01)
G06F 9/30 (2006.01)

(52) U.S. Cl.
CPC .............. *G06F 8/41* (2013.01); *G06F 8/4452* (2013.01); *G06F 9/30032* (2013.01); *G06F 9/30109* (2013.01); *G06F 9/30112* (2013.01); *G06F 9/30138* (2013.01); *G06F 8/453* (2013.01)

(58) Field of Classification Search
None
See application file for complete search history.

(56) References Cited

U.S. PATENT DOCUMENTS

| | | | |
|---|---|---|---|
| 6,629,115 B1 | 9/2003 | Rossignol | |
| 2004/0078549 A1* | 4/2004 | Tanaka | G06F 9/30014 712/22 |
| 2004/0098709 A1* | 5/2004 | Kyo | G06F 8/447 717/140 |
| 2005/0283773 A1* | 12/2005 | Eichenberger | G06F 8/447 717/151 |
| 2006/0048123 A1* | 3/2006 | Martin | G06F 8/4452 717/160 |
| 2008/0016320 A1* | 1/2008 | Menon | G06F 9/30014 712/22 |
| 2012/0254589 A1 | 10/2012 | Corbal San Adrian et al. | |
| 2013/0198495 A1* | 8/2013 | Vick | G06F 8/441 712/226 |
| 2014/0143513 A1* | 5/2014 | Reid | G06F 12/16 711/162 |
| 2014/0189321 A1 | 7/2014 | Uliel et al. | |
| 2014/0189323 A1* | 7/2014 | Bharadwaj | G06F 9/30018 712/224 |

(Continued)

FOREIGN PATENT DOCUMENTS

JP 2001-147804 5/2001
JP 2012-128790 7/2012

(Continued)

*Primary Examiner* — Insun Kang
(74) *Attorney, Agent, or Firm* — Staas & Halsey LLP

(57) ABSTRACT

An apparatus stores a program including a description of loop processing of iterating a plurality of instructions, and rearranges an execution sequence of the plurality of instructions in the program such that the loop processing is pipelined by software pipeline. The apparatus inserts an instruction to use a register for single instruction multiple data (SIMD) extension instruction, into the description of the loop processing in the program.

6 Claims, 18 Drawing Sheets

(56) References Cited

U.S. PATENT DOCUMENTS

| | | | |
|---|---|---|---|
| 2015/0212804 A1* | 7/2015 | Arai .................. | G06F 8/4442 |
| | | | 717/124 |
| 2015/0277874 A1* | 10/2015 | Haraguchi ............. | G06F 8/443 |
| | | | 717/160 |
| 2016/0048380 A1* | 2/2016 | Nakashima ............ | G06F 8/443 |
| | | | 717/160 |

FOREIGN PATENT DOCUMENTS

| | | |
|---|---|---|
| JP | 2014-510352 | 4/2014 |
| JP | 2014-130580 | 7/2014 |

* cited by examiner

71

```
int a[100];
int sum = 0;

for (index=0; index<100; index++) {
  sum += a[index];
}
```

72

```
  move r0, #0    // INITIALIZE sum
  addr r2, a     // ACQUIRE HEAD ADDRESS OF ARRAY a
  add r3, a, 400 // CALCULATE END VALUE OF index LOOP :
  load r4, [r2]  // LOAD VALUE FROM r2
  add r0, r4     // CALCULATE SUM
  add r2 , 4     // ADVANCE ARRAY ADDRESS
  brne LOOP, r2, r3
```

FIG. 15

```
                                  ┌─ 73
  move r0, #0      // INITIALIZE sum
  addr r2, a       // ACQUIRE HEAD ADDRESS OF ARRAY a
  add r3', a, 396  // CALCULATE END VALUE OF index // OPTIMIZATION PREPROCESSING
    load r4', [r2]    // RENAME REGISTER r4 TO r4'

LOOP :             // LOOP FOR TWO INPUT LOOPS
    add r2, 4        // ADVANCE ARRAY ADDRESS
    load r4, [r2]
    add r0, r4'
    add r2, 4
    load r4', [r2]
    add r0, r4
    brne LOOP, r2, r3'

// OPTIMIZATION POSTPROCESSING
    add r2, 4
    load r4, [r2]
    add r0, r4'
```

FIG. 16

```
move r0, #0      // INITIALIZE sum
addr r2, a       // ACQUIRE HEAD ADDRESS OF ARRAY a
add r3', a, 400  // CALCULATE END VALUE OF index // OPTIMIZATION PREPROCESSING
  load rtmp, [r2]    //rtmp:■□□□
  ecsl r4, rtmp, 2 //r4 :□□■□<= r4:□□□□ + rtmp:■□□□ (SHIFT TO LEFT BY TWO ELEMENTS)
  add r2, 4        // ADVANCE ARRAY ADDRESS
  load rtmp, [r2]    //rtmp:▲□□□
  ecsl r4, rtmp, 2 //r4 :■□▲□<= r4:□□■□ + rtmp:▲□□□ (SHIFT TO LEFT BY TWO ELEMENTS)

LOOP :
  add r0, r4
  add r2, 4        // ADVANCE ARRAY ADDRESS
  load rtmp, [r2]    //rtmp:●□□□
  ecsl r4, rtmp, 2 //r4 :▲□●□<= r4:■□▲□ + rtmp:●□□□ (SHIFT TO LEFT BY TWO ELEMENTS)
  brne LOOP, r2, r3'

// OPTIMIZATION POSTPROCESSING
  add r0, r4
  add r2, 4        // ADVANCE ARRAY ADDRESS
  ecsl r4, r4, 2   //r4 :▲□□□ <= r4:■□▲□ + r4:■□▲□ (SHIFT TO LEFT BY TWO ELEMENTS)
  add r0, r4
```

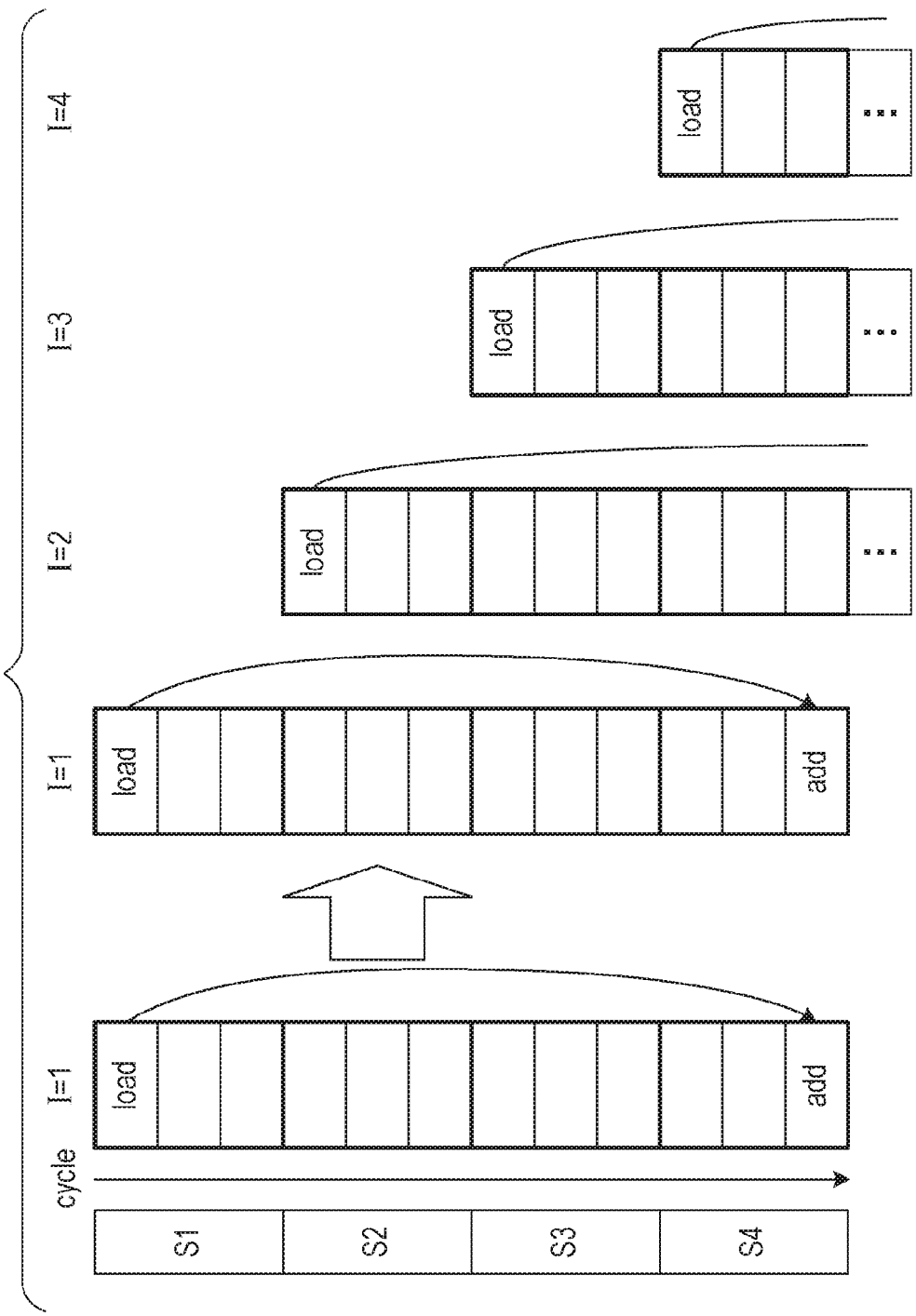

FIG. 18

```
move r0, #0      // INITIALIZE sum
addr r2, a       // ACQUIRE HEAD ADDRESS OF ARRAY a
add r3', a, 400  // CALCULATE END VALUE OF index // OPTIMIZATION PREPROCESSING
 load rtmp, [r2]    //rtmp:■□□□
 ecsl r4, rtmp, 1//r4 :□□□■ <= r4:□□□□ + rtmp:■□□□ (SHIFT TO LEFT BY ONE ELEMENT)
 add r2, 4         // ADVANCE ARRAY ADDRESS
 load rtmp, [r2]    //rtmp:▲□□□
 ecsl r4, rtmp, 1//r4 :□□■▲ <= r4:□□□■ + rtmp:▲□□□ (SHIFT TO LEFT BY ONE ELEMENT)
 add r2, 4         // ADVANCE ARRAY ADDRESS
 load rtmp, [r2]    //rtmp:●□□□
 ecsl r4, rtmp, 1//r4 :□■▲● <= r4:□□■▲ + rtmp:□□□● (SHIFT TO LEFT BY ONE ELEMENT)
 add r2, 4         // ADVANCE ARRAY ADDRESS
 load rtmp, [r2]    //rtmp:◆□□□
 ecsl r4, rtmp, 1//r4 :■▲●◆ <= r4:□■▲● + rtmp:◆□□□ (SHIFT TO LEFT BY ONE ELEMENT)

LOOP :
 add r0, r4
 add r2, 4         // ADVANCE ARRAY ADDRESS
 load rtmp, [r2]    //rtmp:▼□□□
 ecsl r4, rtmp, 1//r4 :▲●◆▼ <= r4:■▲●◆ + rtmp:▼□□□ (SHIFT TO LEFT BY ONE ELEMENT)
 brne LOOP, r2, r3'

// OPTIMIZATION POSTPROCESSING
 add r0, r4
 add r2, 4
 ecsl r4, rtmp, 1
 add r0, r4
 add r2, 4
 ecsl r4, rtmp, 1
 add r0, r4
 add r2, 4
 ecsl r4, rtmp, 1
 add r0, r4
```

APPARATUS AND METHOD FOR HANDLING REGISTERS IN PIPELINE PROCESSING

CROSS-REFERENCE TO RELATED APPLICATION

This application is based upon and claims the benefit of priority of the prior Japanese Patent Application No. 2015-094547, filed on May 7, 2015, the entire contents of which are incorporated herein by reference.

FIELD

The embodiments discussed herein are related to apparatus and method for handling registers in pipeline processing.

BACKGROUND

In developing a program to be executed by a computer, software pipeline (which is also referred to as software pipelining or modulo scheduling) may optimize loop processing. The software pipeline is a compiler optimization method of performing instruction scheduling for loop processing to improve instruction level parallelism in a loop. A bottleneck of execution performance of a large-scale program is mainly the loop processing. Accordingly, it is significantly important to optimize loop processing by software pipeline.

In software pipeline, instruction scheduling is performed across loop iterations. According to the scheduling, processing for multiple loops is executed in parallel, and live ranges of registers used in the loops overlap each other. Accordingly, register renaming is performed using a compiler so as not to use the same register in the loops executed in parallel.

Instructions to be executed by a processor are stipulated based on an instruction set architecture (ISA). The ISA may include a single instruction multiple data (SIMD) extension instruction. The SIMD extension instruction enables one instruction to be applied to multiple pieces of data. The enhancement of such ISA may improve throughput of the processor.

As techniques of improving the throughput of the processor, a technique for enhancing an instruction set architecture for vectorization instruction, for example, has been in consideration. Further, another technique has also been in consideration which shortens processing time by reducing the number of accesses to a register file.

One example of the techniques for increasing the efficiency of processing executed by the processor is a technique for vectorization of a conditional loop. Further, there is also another technique for selectively storing data elements of two combined sources in a destination through execution of an alignment instruction.

The related techniques are disclosed in, for example, Japanese Laid-open Patent Publication Nos. 2001-147804, and 2012-128790, and Japanese National Publication of International Patent Application No. 2014-510352.

SUMMARY

According to an aspect of the invention, an apparatus stores a program including a description of loop processing of iterating a plurality of instructions, and rearranges an execution sequence of the plurality of instructions in the program such that the loop processing is pipelined by software pipeline. The apparatus inserts an instruction to use a register for single instruction multiple data (SIMD) extension instruction, into the description of the loop processing in the program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a diagram illustrating an example of an instruction stream after a first software pipeline, according to an embodiment;

FIG. 16 is a diagram illustrating an example of an instruction stream after a second software pipeline, according to an embodiment;

FIG. 17 is a diagram illustrating an example of a case where the number of MVEs=4; and FIG. 18 is a diagram illustrating an example of an instruction stream after a second software pipeline in a case where the number of MVEs=4.

DESCRIPTION OF EMBODIMENTS

As described above, with application of software pipeline, loop processing may be executed in pipeline, and may achieve improvement of the efficiency of the processing.

However, when register renaming is performed in optimization using software pipeline, the number of registers to be used increases. Because the number of registers increases due to application of software pipeline, it is more likely that there may be lack of registers when the registers are to be allocated. In the case of lack of registers, save and restore instructions (load and store instructions) for the contents in the registers may be added to the loop. Addition of the save and restore instructions disadvantageously affects execution performance, and cancels the effect of improving the effective performance by software pipeline.

An object of one aspect of the present disclosure is to reduce the number of registers to be used in software pipeline.

Embodiments will be described below with reference to drawings. The embodiments may be combined with each other so as not to cause a contradiction.

First Embodiment

In conventional software pipeline, when the number of registers becomes excessively large, optimization may not be performed. Thus, in First embodiment, the number of registers in software pipeline optimization is reduced by register renaming using a register for, for example, SIMD extension instruction (hereinafter referred to as SIMD extension register). By reducing the number of registers, the possibility of application of software pipeline may increase.

Figure 1:
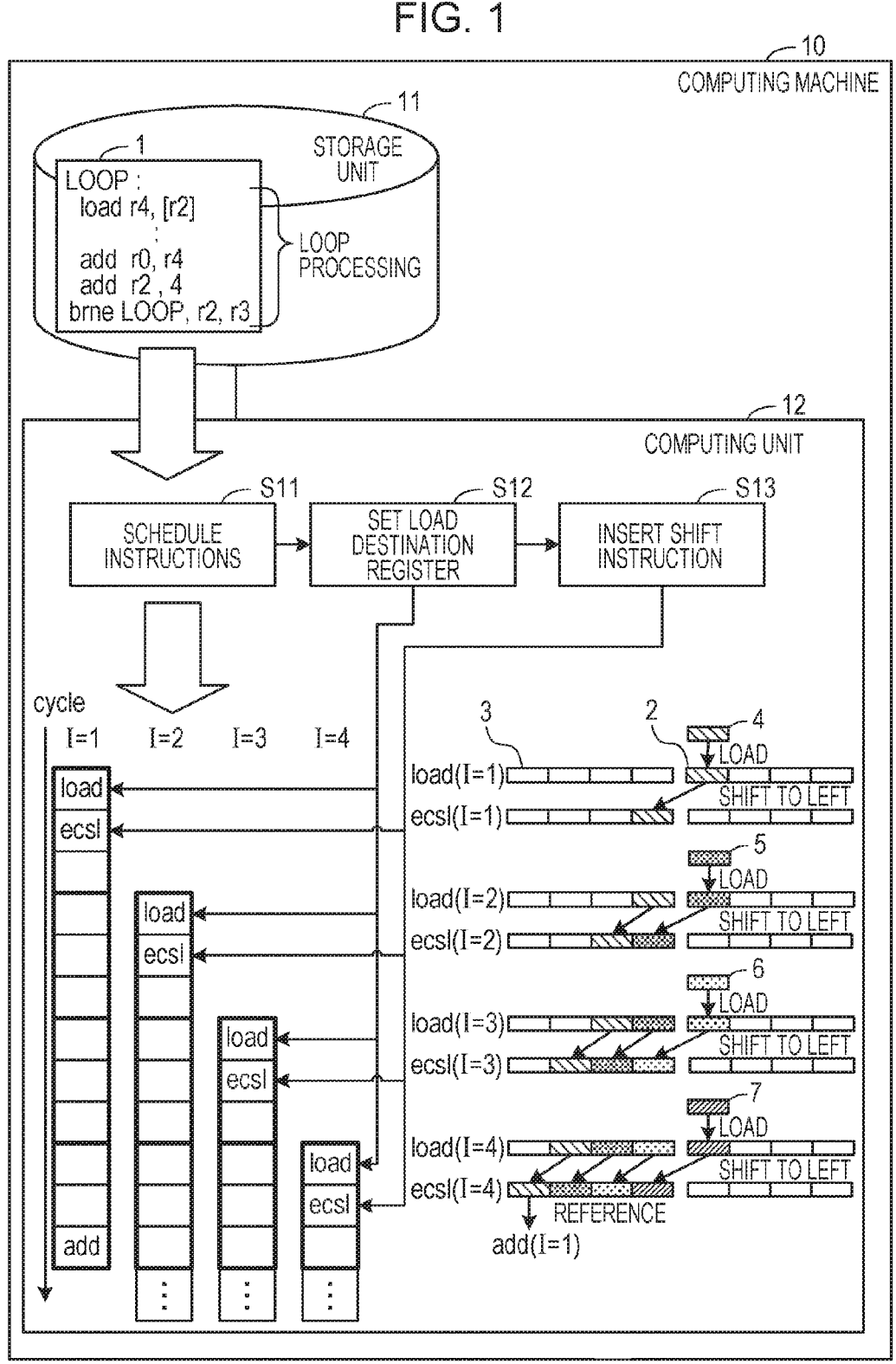
FIG. 1 is a diagram illustrating an example of a configuration of a computing machine, according to an embodiment.

FIG. 1 is a view illustrating exemplary configuration of a calculator in accordance with First embodiment. A computing machine 10 includes a storage unit 11 and a computing unit 12.

The storage unit 11 stores a program 1 including a description of loop processing of iterating multiple instructions.

The computing unit 12 rearranges the execution sequence of the multiple instructions in program 1 such that the loop processing is pipelined by software pipeline, according to instruction scheduling (step S11). Next, the computing unit 12 sets a first register 2 as a load destination of data in a load instruction among the multiple instructions (step S12). The computing unit 12 further inserts a shift instruction to shift to left a data row in a storage area, which is acquired by combining the first register 2 with the right side of a second register 3 having a storage area of a multiple pieces of data, into the description of the loop processing in the program 1 (step S13). Then, the computing unit 12 outputs the software-pipelined program.

The second register 3 is, for example, a SIMD extension register. For example, the computing unit 12 sets a shift amount of the shift instruction based on N (N is an integer of two or more) indicating the number of pieces of data that are simultaneously held in a period, for example, from a loading process of data according to the load instruction to a reference process of the data according to an instruction including reference (for example, add instruction). For example, the computing unit 12 sets the shift amount per shift instruction such that the data loaded into the first register 2 moves to a head of the second register 3 after N shifts. In the example illustrated in FIG. 1, the second register 3 has the storage area that is four times as large as a data length of data 4 to 7 to be loaded. In the example illustrated in FIG. 1, N, the number of pieces of data simultaneously held, is "4". In the example illustrated in FIG. 1, the shift amount for the data length of data 4 to 7 is set such that the data 4 to 7 loaded into the first register 2 moves to the head of the second register 3 by four leftward shifts.

When the computing machine 10 executes the program that has been software-pipelined in the computing unit 12, following processing is executed every iteration of the pipelined loop processing.

First, according to the load instruction in the multiple instructions indicating processing for one loop, data is loaded into the first register 2. Next, according to the shift instruction, the data row in the storage area acquired by combining the first register 2 with the right side of the second register 3 is shifted to left. Iterations are performed in parallel by pipeline, repeating the leftward shift during execution of one iteration. Then, according to the instruction including reference (for example, add instruction), data moved to the head of the second register 3 by repeating the leftward shift is referred to.

In the example illustrated in FIG. 1, data 4 is loaded into the first register 2 according to the load instruction in a first iteration (I=1). The loaded data 4 is shifted to left by a predetermined amount (for example, data length of the data 4) according to a shift instruction (ecsl) in the first iteration (I=1). As a result, the data 4 moves to a rearmost (right end in the drawing) area of the second register 3.

Then, according to a load instruction in a second iteration (I=2), data 5 is loaded into the first register 2. The two pieces of loaded data 4, 5 are shifted to left by a predetermined amount according to a shift instruction (ecsl) in the second iteration (I=2). Next, data 6 is loaded into the first register 2 according to a load instruction in a third iteration (I=3). The three pieces of loaded data 4 to 6 are shifted to left by a predetermined amount according to a shift instruction (ecsl) in the third iteration (I=3). Data 7 is loaded into the first register 2 according to a load instruction in a fourth iteration (I=4). The four pieces of loaded data 4 to 7 are shifted to left by a predetermined amount according to a shift instruction (ecsl) in the fourth iteration (I=4).

After the shift instruction (ecsl) in the fourth iteration (I=4) is performed, the data 4 moves to the head of the second register 3. Then, according to the add instruction in the first iteration (I=1), the data 4 at the head of the second register 3 is referred.

In this manner, use of the two registers achieves software pipeline. As compared to the case where registers for data simultaneously held are allocated by register renaming, the number of registers is reduced.

In the example illustrated in FIG. 1, pipelining is performed so as to process four iterations in the loop processing in parallel. In this case, until the data loaded according to the load instruction in the first iteration (I=1) is referred according to the add instruction, load instructions in the second to fourth iterations (I=2, 3, 4) are performed. When it is attempted to address this situation by register renaming without using the shift instruction, four registers may be used. On the contrary, in First embodiment, software pipeline may be applied using only two registers.

In First embodiment, the number of registers is reduced by effectively using the register such as the SIMD extension register capable of storing mega data. That is, the SIMD extension register has a storage area that may store the SIMD extension instruction. The SIMD extension instruction contains multiple pieces of data to be processed and thus, contains a greater amount of data than normal instructions. Accordingly, the SIMD extension register has a storage area that is several times (four times in the example illustrated in FIG. 1) as large as a data length of data loaded according to the load instruction. However, many processors may not load and refer data that designates only the storage area other than the head of the SIMD extension register. Consequently, in First embodiment, the first register 2 is combined with the right side of the second register 3 such as the SIMD extension register having a large storage area, and data in the first register 2 is held in a predetermined area of the second register 3. Thereby, the register such as the SIMD extension register having a large storage capacity is effectively used to reduce the number of registers used in software pipeline. This suppresses lack of registers, and increases the possibility of efficient processing by software pipeline.

Moreover, in First embodiment, processing corresponding to the two instructions, that is, a store (save) instruction and a load (restore) instruction, is embodied as one shift instruction (ecsl). This utilizes below-mentioned two features.

The first feature is that the shift instruction (ecsl) is an instruction to sequentially shift data from a higher element (right storage area) to a lower element (left storage area). The second feature is that software pipeline is repetition of loop. These features enable simultaneous execution of save (to a most significant element) and restore (to a least significant element). Further, since an element number indicating an element in the SIMD register does not have to be designated, the instruction itself never changes every loop, and replication of the instruction, for example, unroll does not have to be desired. These advantages in First embodiment may not be acquired by designating a free higher element in the register if any, and performing save and restore.

The pipelining illustrated in FIG. 1 may be applied only when other pipelining lacks in registers. For example, when software pipeline is performed using register renaming, the computing unit 12 determines whether or not registers for data simultaneously held may be reserved. In the case of lack of registers, as illustrated in FIG. 1, the computing unit 12 sets the first register as a load destination of data in the load instruction, and adds the shift instruction, to achieve software pipeline. Thereby, if more efficient pipeline is available, the pipeline may be applied.

The pipelining in First embodiment may be performed at compile time of the program 1. An execution file generated by pipelining at compile time is executed by the calculator with the processor having the SIMD extension register.

The computing unit 12 may be embodied as a processor of the computing machine 10. The storage unit 11 may be embodied as a memory of the computing machine 10.

Second Embodiment

Next, Second embodiment will be described. In Second embodiment, optimization by software pipeline is performed at compile time of a source file. In Second embodiment, optimization by software pipeline is achieved using a SIMD extension-register combination shift instruction (hereinafter referred to as combination shift instruction) to shift data in a storage area acquired by combining two SIMD extension registers to each other.

Figure 2:
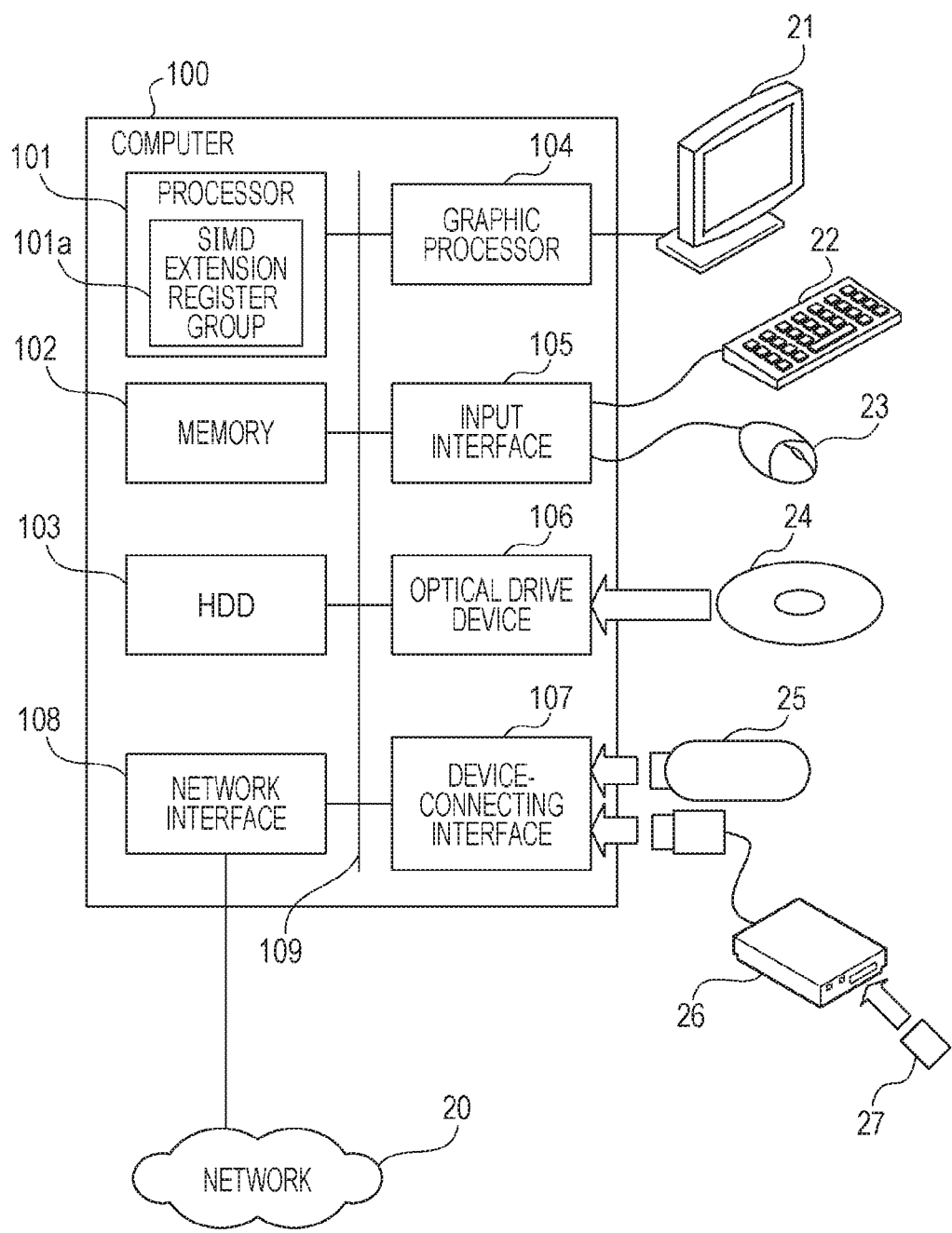
FIG. 2 is a diagram illustrating an example of a hardware configuration of a computer, according to an embodiment.

FIG. 2 is a view illustrating exemplary configuration of hardware of a computer used in Second embodiment. A computer 100 is controlled by a processor 101. The processor 101 is connected to a memory 102 and multiple peripheral devices via a bus 109. The processor 101 may be a multi-processor. The processor 101 is, for example, a central processing unit (CPU), a micro processing unit (MPU), or a digital signal processor (DSP). At least a part of functions performed by execution of the program by the processor 101 may be embodies as an electronic circuit, such as an application specific integrated circuit (ASIC) or a programmable logic device (PLD).

The processor 101 supports ISA having the SIMD extension instruction. The processor 101 may have an instruction pipeline. When the instruction is pipelined on the processor, a scope of a solution acquired by pipelining an instruction stream of a loop body by instruction scheduling is extended. This may find a solution having a high instruction level parallelism, greatly increasing the optimization effect. The processor 101 includes a SIMD extension register group 101a. The SIMD extension register group 101a is a collection of registers having a data width that may store the SIMD extension instruction.

The memory 102 is used as a main memory of the computer 100. The memory 102 temporarily stores at least a part of an operating system (OS) program and an application program that are executed by the processor 101. The memory 102 also stores various types of data used in processing of the processor 101. A volatile semiconductor storage device, such as a random access memory (RAM), is used as the memory 102.

The peripheral devices connected to the bus 109 are a hard disk drive (HDD) 103, a graphic processor 104, an input interface 105, an optical drive device 106, a device-connecting interface 107, and a network interface 108.

The HDD 103 magnetically writes and read data to and from an internal disc. The HDD 103 is used as an auxiliary memory of the computer 100. The HDD 103 stores an OS program, an application program, and various types of data. A nonvolatile semiconductor storage device (SSD: solid state drive) such as a flash memory may be used as the auxiliary memory.

A monitor 21 is connected to the graphic processor 104. The graphic processor 104 displays an image on a screen of the monitor 21 according to an instruction from the processor 101. Examples of the monitor 21 include a display using a cathode ray tube (CRT) and a liquid crystal display.

A keyboard 22 and a mouse 23 are connected to the input interface 105. The input interface 105 transmits signals from the keyboard 22 and the mouse 23 to the processor 101. The mouse 23 is an example of a pointing device, and other pointing devices may be used. Examples of the other pointing device include touch panel, tablet, touch pad, and tack ball.

The optical drive device 106 reads data recorded in an optical disc 24 by using a laser beam or the like. The optical disc 24 is a portable storage medium that records data readable by light reflection. Examples of the optical disc 24 include a digital versatile disc (DVD), a DVD-RAM, a compact disc read only memory (CD-ROM), and a CD-R (Recordable)/RW (ReWritable).

The device-connecting interface 107 is a communication interface for connecting peripheral devices to the computer 100. For example, a memory device 25 and a memory reader/writer 26 are connected to the device-connecting interface 107. The memory device 25 is a storage medium having a function of communicating with the device-connecting interface 107. The memory reader/writer 26 writes data to a memory card 27, or reads data from the memory card 27. The memory card 27 is a card-type storage medium.

The network interface 108 is connected to a network 20. The network interface 108 transmits and receives data to and from another computer or a communication device via the network 20.

Such hardware structure enables the processing in Second embodiment. The computing machine 10 in First embodiment may be embodied by using the same hardware as the computer 100 in FIG. 2.

The computer 100 executes the program recorded in a computer-readable storage medium, performing the processing in Second embodiment. The programs in which contents of the processing executed by the computer 100 are described may be recorded in various storage media. For example, the program executed by the computer 100 may be stored in the HDD 103. The processor 101 loads at least a part of the program in the HDD 103 into the memory 102, and executes the program. The program executed by the computer 100 may be recorded in portable storage media, such as the optical disc 24, the memory device 25, and the memory card 27. The program stored in the portable storage media becomes executable after installation into the HDD 103 according to control of the processor 101. Alternatively, the processor 101 may read the program directly from the portable storage medium and execute the program.

In Second embodiment, the computer 100 has the compiler, and the compiler compiles the source file of the program. At this time, software pipeline may be applied to the loop processing.

Figure 3:
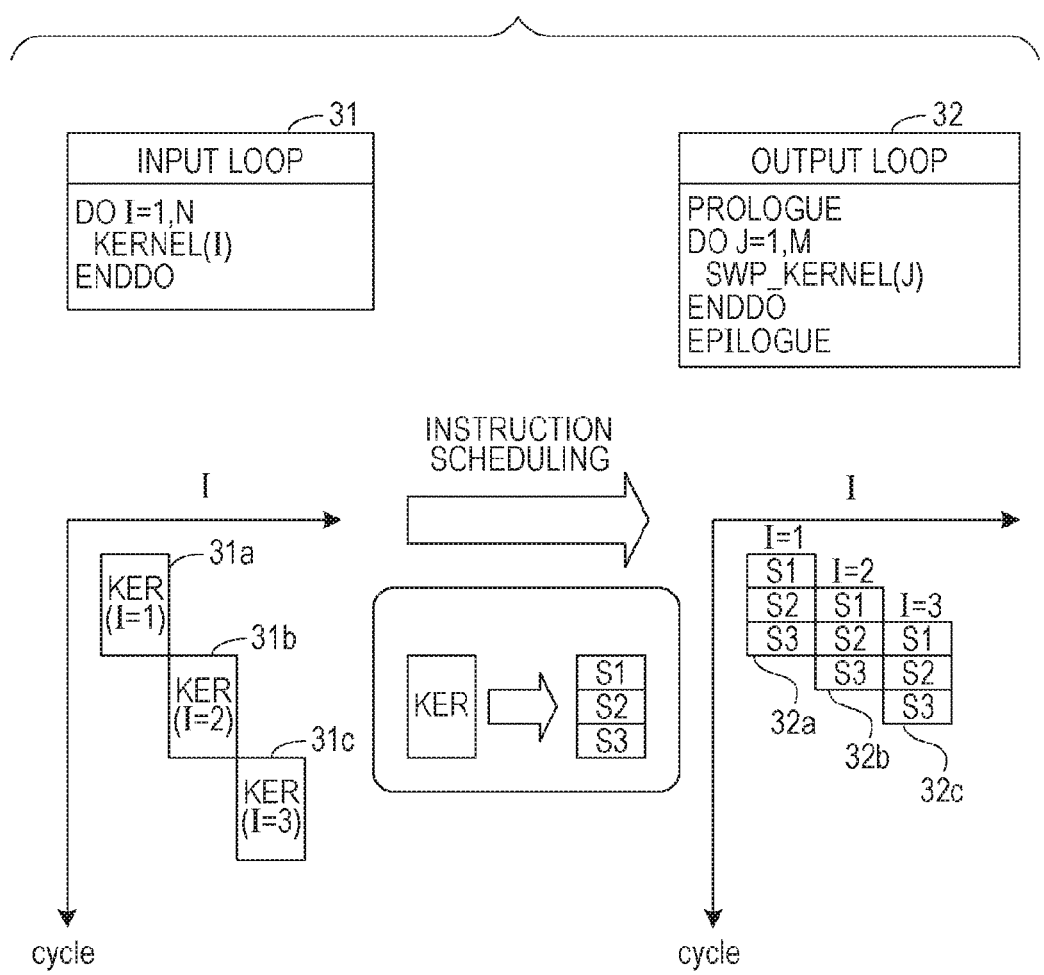
FIG. 3 is a diagram illustrating an example of software pipeline, according to an embodiment.

FIG. 3 is a view illustrating an example of software pipeline. In an input loop 31 before software pipeline, kernels 31a, 31b, and 31c are sequentially executed in each iteration. The kernels 31a, 31b, and 31c constitute an instruction stream to be iteratively executed. The input loop 31 is a state before registers are allocated, a pseudo register before allocation (hereinafter referred to as pseudo register) is set to an operand of each instruction.

At compile time, instruction scheduling is performed by software pipeline. In instruction scheduling, instructions are rearranged so as to avoid pipeline stall by suppressing an operator resource contention. At this time, each of the kernels 31a, 31b, 31c is divided into a group of some instruction streams, which are referred to as stages.

In an output loop 32 deformed by instruction scheduling, the instruction streams formed by overlapping all stages S1, S2, and S3 become loop kernels 32a, 32b, and 32c. The stages S1, S2, and S3 has the same number of cycles, and in all cycles, no resource contention arises between stages in each cycle. For example, when the processor 101 includes two ALUs (Arithmetic and Logic Unit), the number of instructions that request the ALU is less than three in the same cycle.

In instruction scheduling, instructions are arranged in consideration of the use state of the pseudo register, live range, and contention among computing resources.

Figure 4:
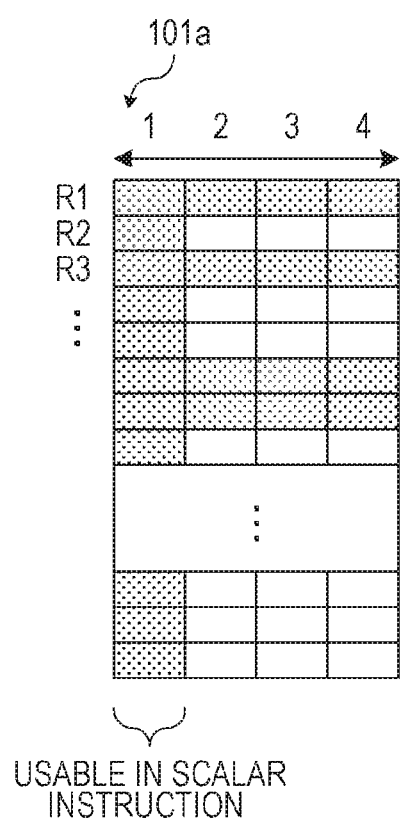
FIG. 4 is a diagram illustrating a usage example of pseudo registers, according to an embodiment.

FIG. 4 is a view illustrating a usage example of the pseudo registers. The SIMD extension register group 101a includes multiple registers R1, R2, R3, . . . . The registers R1, R2, R3, . . . are floating-point registers, and 4-wide SIMD extension registers. That is, the SIMD extension register has a storage area that is four times as large as a data width of unit data handled by the processor 101.

Each of the registers R1, R2, R3, . . . is configured of four elements in the storage area. Element numbers 1 to 4 are assigned to the respective four elements. In storing the SIMD extension instruction, all of the four elements of the registers R1, R2, R3, . . . are used.

In ISA of the processor in Second embodiment, in a scalar instruction, only the element having the element number "1" may be used, and elements having the element numbers "2", "3", and "4" as extension parts may not be used. That is, for register allocation, only the head element (element number "1") in each register may be used, and the other extension elements (element number "2", "3", "4") may not be used. Accordingly, in each of the registers R1, R2, R3, . . . , only the head element may be used, and the other elements may not be used.

In FIG. 4, used elements in the registers R1, R2, R3, . . . are hatched. For example, in the register R2, the element having the element number "1" is used, and the other elements are not used. That is, the elements having the element numbers "2", "3", and "4" are empty areas.

When all the allocatable elements have been allocated, any more register may not be allocated. That is, even when an empty element is present in the SIMD extension register group, there may be a lack of registers. Although there is an ISA in which the element having the element number "2" is usable in the scalar instruction, in general, it is impossible to use all the elements in the SIMD extension register.

When software pipeline is applied, renaming of a pseudo register is required.

Figure 5:
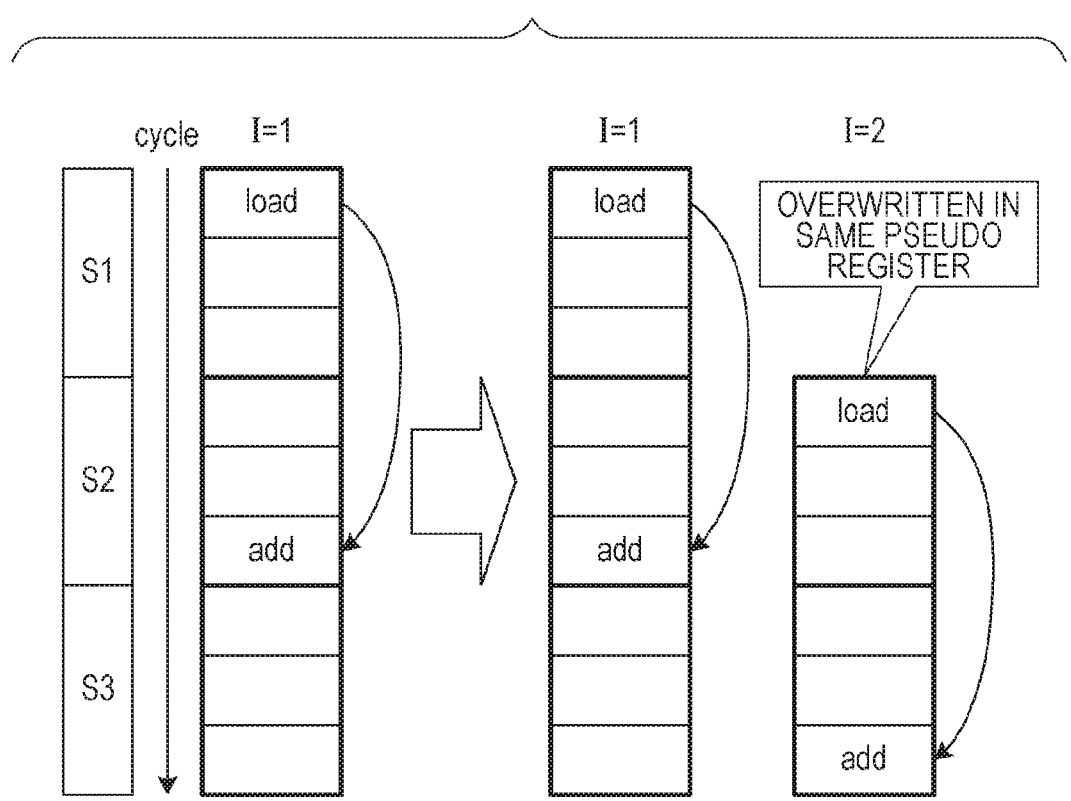
FIG. 5 is a diagram illustrating an example of a case where register renaming occurs, according to an embodiment.

FIG. 5 is a view illustrating an example of the occurrence of register renaming. It is assumed that the pseudo register defined in the scalar load instruction is referred according to the scalar add instruction. A virtual micro-architecture is assumed and it is assumed that instruction scheduling is made as illustrated in FIG. 5. When instructions are scheduled to three stages S1, S2, and S3, in the output loop, the stages overlap to generate new kernels. At this time, when the same pseudo register is used in the first iteration (I=1) and the next iteration (I=2), the pseudo register is overwritten according to the load instruction in the second iteration. This causes a false dependence (Write After Read).

To resolve Write After Read and overlap the stages, register renaming is performed. Generally, any number of stages may be used, and the number of iterations of instructions at which the stages overlap depends on the result of scheduling. The number of registers in register renaming is referred to as the number of modulo variable expansions (MVE). In the example illustrated in FIG. 5, since two registers are used, the number of MVEs is 2. In the loop after optimization, register renaming is performed, and unroll (loop expanding processing) is performed the number of MVEs times.

Figure 6:
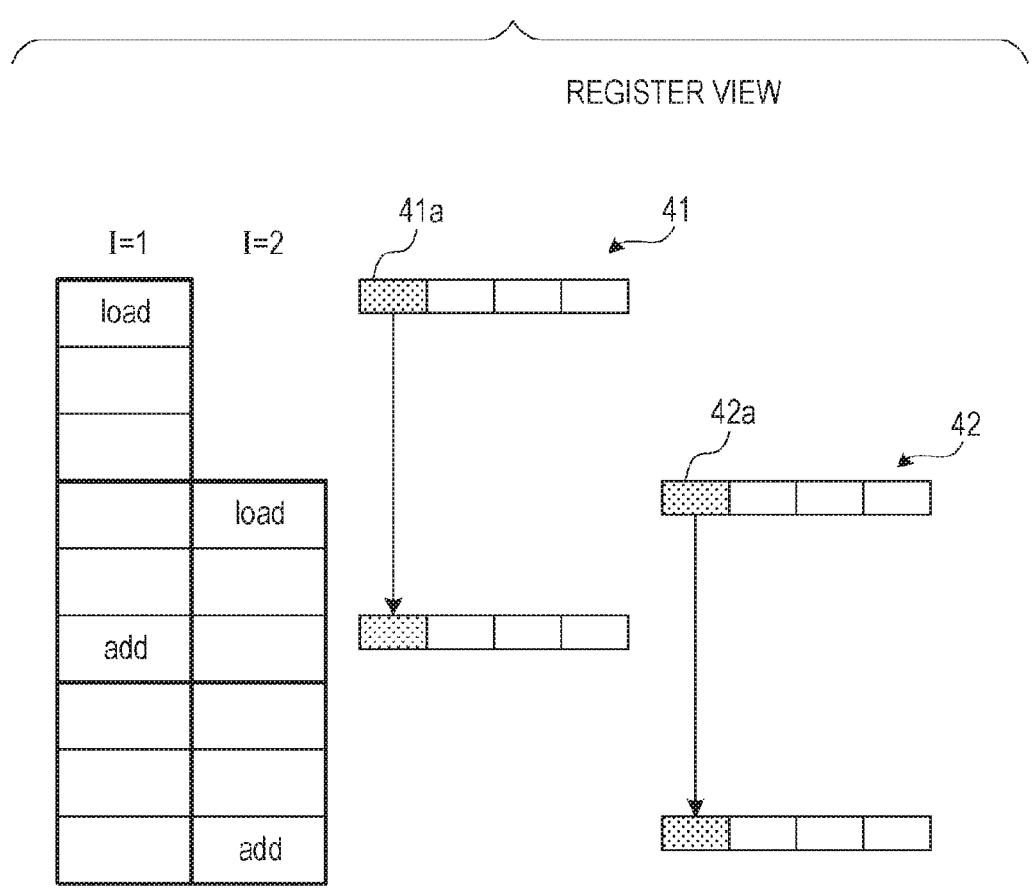
FIG. 6 is a diagram illustrating an example of allocation of pseudo registers in each iteration of a loop, according to an embodiment.

FIG. 6 is a view illustrating an allocation example of pseudo registers in each iteration of the loop. In the load instruction (load) in iteration of I=1, a first element of a SIMD extension register 41 is allocated as a pseudo register 41a. In the load instruction in iteration of I=2, a first element of a SIMD extension register 42 is allocated as a pseudo register 42a. The live ranges of the pseudo register 41a defined in I=1 iteration and the pseudo register 42a defined in I=2 iteration overlap at period of two cycles.

When the head elements of the SIMD extension registers 41, 42 are allocated as the pseudo registers 41a, 42a, respectively, in each iteration in this manner, the SIMD extension registers whose number is equal to the number of MVEs are used. That is, the allocation of the pseudo registers as illustrated in FIG. 6 is available only when empty SIMD extension registers whose number is equal to the number of MVEs are present.

The elements having the element numbers "2" to "4" in the SIMD extension registers 41, 42 are not used. Thus, in Second embodiment, when there is a lack of empty SIMD extension registers, the number of SIMD extension registers in software pipeline is reduced by effectively using the elements having the element numbers "2" to "4" in the SIMD extension registers 41, 42.

The combination shift instruction may be used to effectively utilize the elements having the element numbers "2" to "4" in the SIMD extension registers. As in scheduling other instructions, the combination shift instruction is also arranged in consideration of contention among computing resources, live range of the pseudo registers, and latency. Then, the pseudo registers in each stage are renamed, and overlapped new kernels are generated.

Figure 7:
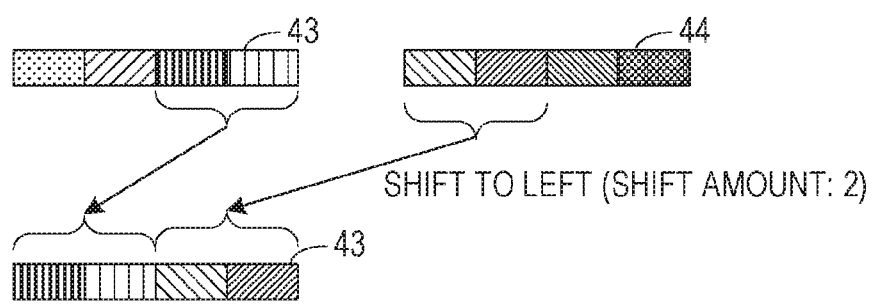
FIG. 7 is a diagram illustrating an example of data shift based on a combination shift instruction, according to an embodiment.

FIG. 7 is a view illustrating an example of data shift according to the combination shift instruction. In the combination shift instruction, two SIMD extension registers 43, 44 are handled as one combined register. According to the combination shift instruction, data in each element in the combined register is shifted to left. The shift amount is represented by an immediate value (numerical value written as an operand). FIG. 7 illustrates the case of shift amount of "2".

Using the combination shift instruction enables storage and reading of data into and from an unused element in the SIMD extension register.

Figure 8:
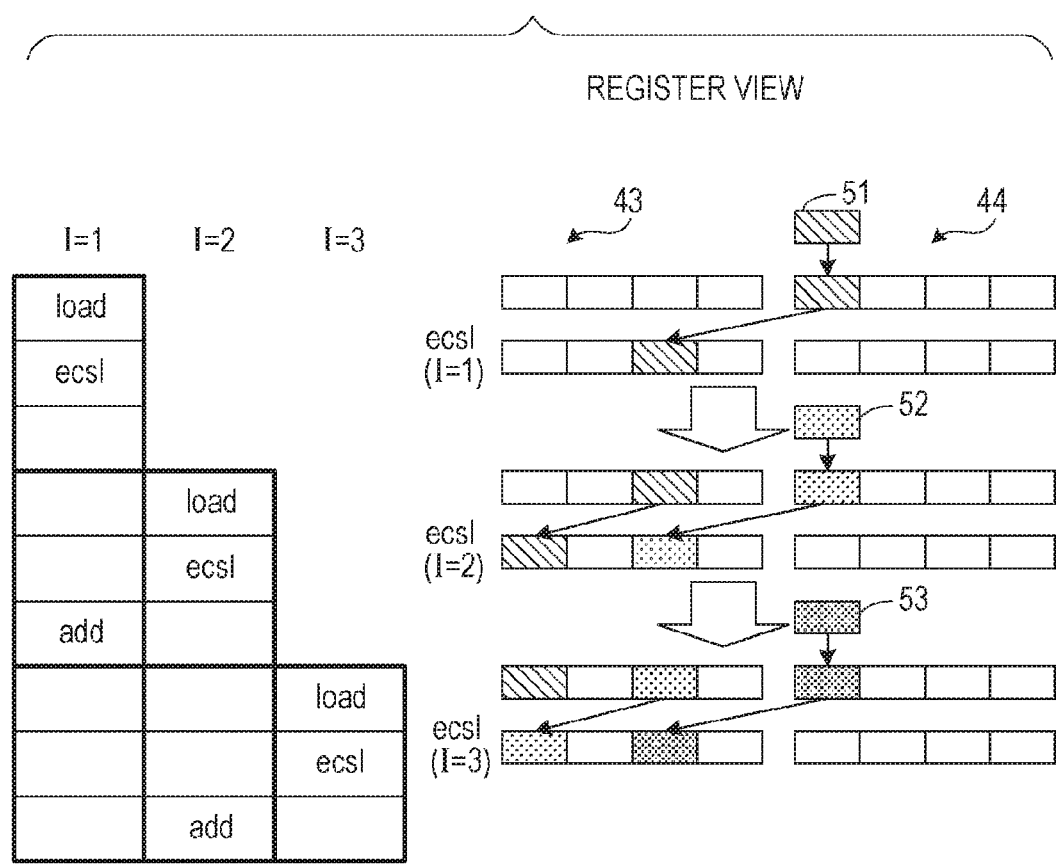
FIG. 8 is a diagram illustrating an example of allocation of pseudo registers using a combination shift instruction, according to an embodiment.

FIG. 8 is a view illustrating an allocation example of pseudo registers using the combination shift instruction. "ecsl" in FIG. 8 represents the combination shift instruction.

In I=1 iteration, data 51 is loaded into the element having the element number "1" in the SIMD extension register 44. Then, according to the combination shift instruction having a shift amount of "2", the loaded data 51 is transferred to the element having the element number "3" in the SIMD extension register 43.

Next, in I=2 iteration, data 52 is loaded into the element having the element number "1" in the SIMD extension register 44. At this time, the data 51 loaded in the I=1 iteration that has been already transferred, and the data 51 is not overwritten. Then, according to the combination shift instruction having a shift amount of "2", the data 51 is transferred to the element having the element number "1" in the SIMD extension register 43, and the data 52 is transferred to the element having the element number "3" in the SIMD extension register 43. In the I=1 iteration, the data 51 in the element having the element number "1" in the SIMD extension register 43 is referred according to the add instruction.

At this time, the elements having the element number "3" in the SIMD extension registers 43, 44 become available, thereby decreasing register pressure.

The shift amount in the combination shift instruction depends on overlap (corresponding to the number of MVEs) of live ranges of the pseudo registers before instruction insertion. For example, when the number of MVEs is 2, and the width of the SIMD extension register is four times as long as the pseudo register, as illustrated in FIG. 8, the shift amount is "2". When the number of MVEs is 4, and the width of the SIMD extension register is four times as long as the pseudo register, the shift amount may be set at "1". The unroll processing for the number of MVEs in software pipeline as illustrated in FIG. 6 may be achieved by shift according to the combination shift instruction. Accordingly, when the combination shift instruction is inserted, the unroll processing does not have to be performed.

Next, compile processing using software pipeline in Second embodiment will be described in detail.

Figure 9:
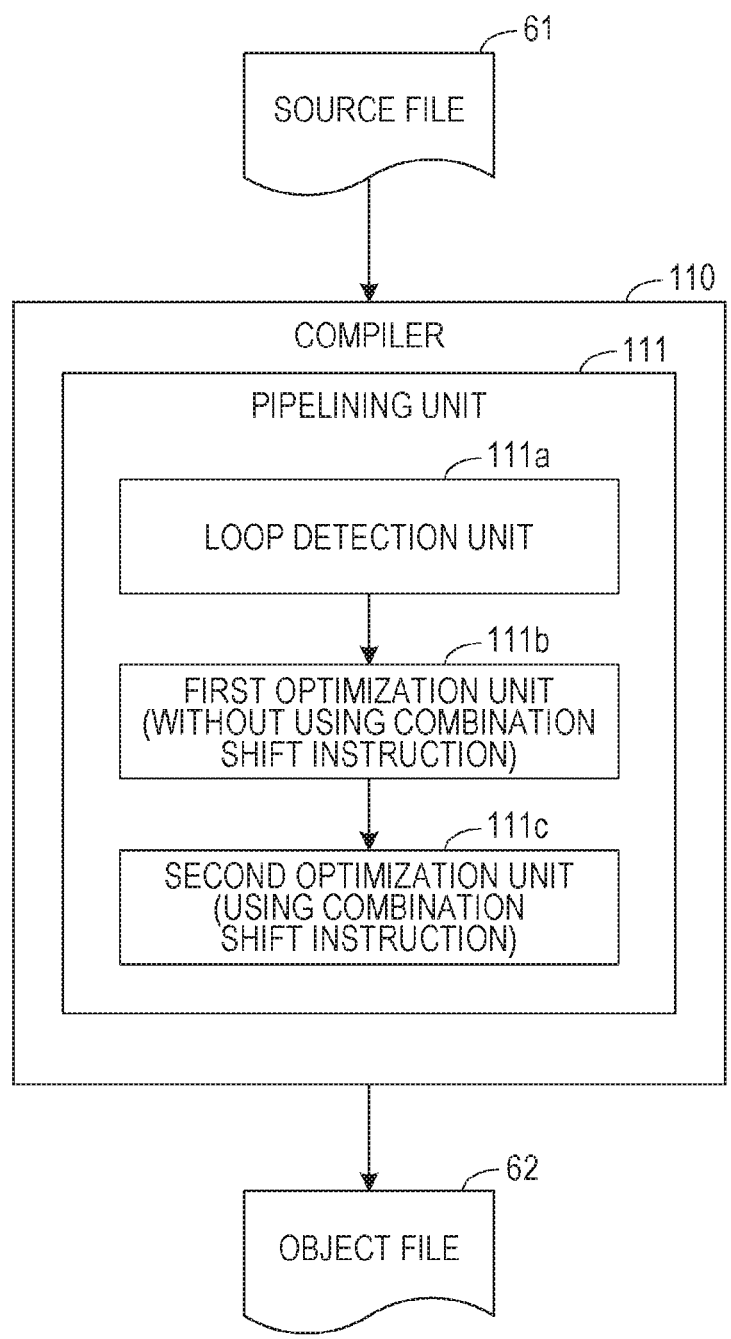
FIG. 9 is a diagram illustrating an example of functions of a compiler, according to an embodiment.

FIG. 9 is a block diagram illustrating functions of a compiler. A compiler 110 controlled by the computer 100 converts a program described in a source file 61 in a high-level language to a code executable by the computer 100 to generate an object file 62.

The compiler 110 includes a pipelining unit 111 that optimizes the instruction stream of the loop processing by software pipeline during conversion of the program. The pipelining unit 111 includes a loop detection unit 111a, a first optimization unit 111b, and a second optimization unit 111c. The loop detection unit 111a detects the instruction stream indicating the loop processing in the program described in the source file 61. The first optimization unit 111b optimizes the loop processing by software pipeline without using the combination shift instruction as illustrated in FIG. 6.

The second optimization unit 111c optimizes the loop processing by using the combination shift instruction by software pipeline as illustrated in FIG. 8. For example, the second optimization unit 111c analyzes overlap of live ranges of the pseudo registers and overlap of computing resources, in the intermediate representation generated by the first optimization unit 111b, based on information on ISA and micro-architecture. The micro-architecture is an installed architecture on machine language executed by the processor. The second optimization unit 111c inserts a transfer instruction to the SIMD extension register, based on an analysis result.

Lines connecting the components to each other in FIG. 9 represent a part of a communication path, and communication paths other than the illustrated communication paths may be set. The function of each component in FIG. 9 may be embodied by causing the computer to execute a program module corresponding to the component.

Next, a procedure of software pipeline will be described.

Figure 10:
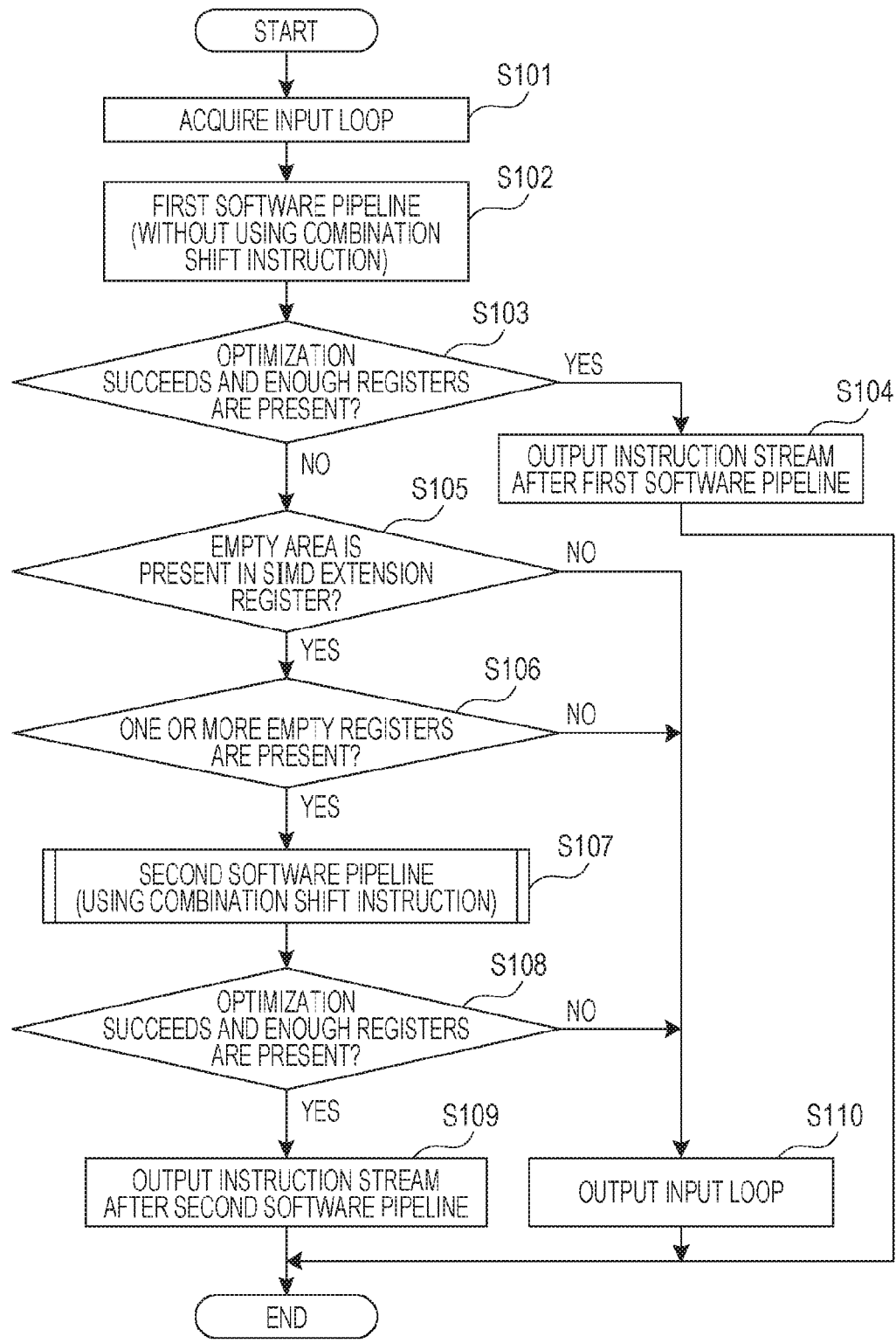
FIG. 10 is a diagram illustrating an example of an operational flowchart for a procedure of software pipeline, according to an embodiment.

FIG. 10 is an operational flowchart illustrating an example of a procedure of software pipeline.

[step S101] The loop detection unit 111a acquires the instruction stream (input loop) of the loop processing from the program in the source file 61, which is converted into the intermediate representation by the compiler. For example, an instruction stream corresponding to for statement is acquired.

[step S102] first optimization unit 111b optimizes the loop processing by software pipeline (first software pipeline) without using the combination shift instruction.

[step S103] The second optimization unit 111c determines whether or not optimization succeeds and registers are enough. For example, the second optimization unit 111c determines that sufficient number of registers are available when there are available SIMD extension registers corresponding to the number of pseudo registers to be used. When optimization succeeds and registers are enough, processing proceeds to step S104. When optimization fails or optimization succeeds but registers are not enough, processing proceeds to step S105.

[step S104] The second optimization unit 111c outputs the instruction stream after the first software pipeline, and finishes processing.

[step S105] The second optimization unit 111c determines whether or not an empty area (unused element) is present in the SIMD extension register to be used in the loop processing in the input loop. When an empty area is present, processing proceeds to step S106. When an empty area is absent, processing proceeds to step S110.

[step S106] The second optimization unit 111c determines whether or not one or more empty registers are present at execution of the input loop. When one or more empty registers are present, processing proceeds to step S107. When the empty registers are absent, processing proceeds to step S110.

[step S107] The second optimization unit 111c performs second software pipeline using the combination shift instruction. Details of the processing will be described later (See FIG. 11).

[step S108] The second optimization unit 111c determines whether or not optimization by the second software pipeline succeeds and registers are enough. When optimization succeeds and registers are enough, processing proceeds to step S109. When optimization fails or registers are not enough, processing proceeds to step S110.

[step S109] The second optimization unit 111c outputs the instruction stream after the second software pipeline, and finishes processing.

[step S110] The second optimization unit 111c abandons software pipeline, outputs the input loop as it is, and finishes processing.

When the first software pipeline is unavailable as described above, the second software pipeline using the combination shift instruction is performed. Next, the second software pipeline will be described in detail.

Figure 11:
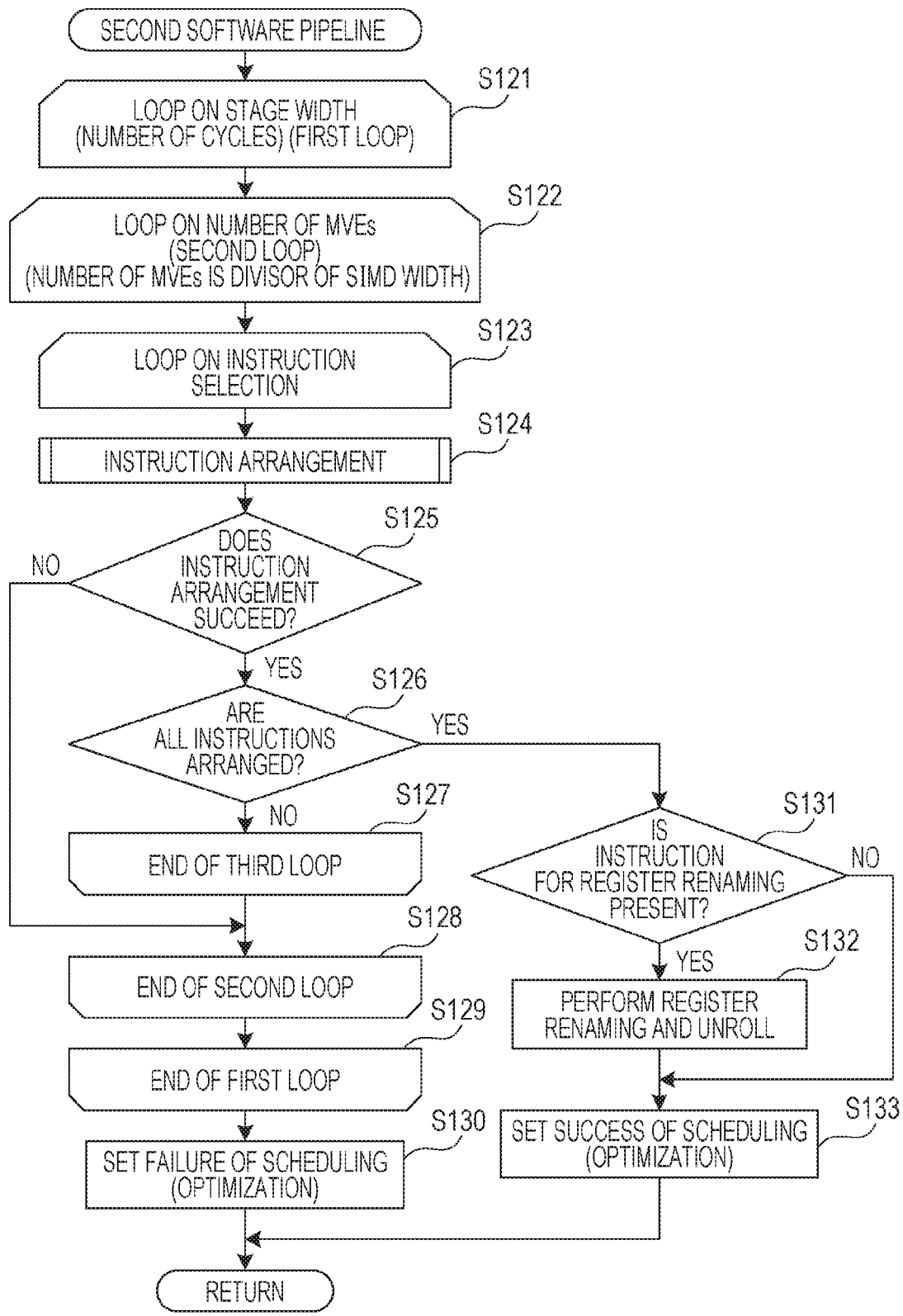
FIG. 11 is a diagram illustrating an example of an operational flowchart for a second software pipeline, according to an embodiment.

FIG. 11 is an operational flowchart illustrating an example of a procedure of the second software pipeline.

[step S121] The second optimization unit 111c performs a loop (first loop) in step S122 to S128 on a stage width (the number of cycles). In the first loop, the stage width is gradually increased from 1 cycle. The loop is iterated until the stage width reaches a predetermined upper limit. In consideration of length of translation time, the upper limit of the stage width is set at 100 cycles, for example.

[step S122] The second optimization unit 111c performs a loop (second loop) processing in step S123 to S127 on the number of MVEs. In the second loop, the second optimization unit 111c gradually increases the number of MVEs from 1 to a SIMD width (the number of elements in the SIMD extension register). The number of MVEs is set at a divisor of the SIMD width. In the case of the SIMD width=4, the number of MVEs may be 1, 2, or 4. The number of MVEs may be used as the shift amount of the combination shift instruction.

[step S123] The second optimization unit 111c performs a loop (third loop) processing in step S124 to step S126 on instruction selection. In the third loop, the second optimization unit 111c selects the instruction in the input loop one by one.

[step S124] The second optimization unit 111c executes arrangement processing of the selected instructions. Details of the instruction arrangement processing will be described later (See FIG. 12). The instruction arrangement is processing of arranging the instruction executed in each cycle in each iteration as illustrated in FIG. 8.

[step S125] The second optimization unit 111c determines whether or not arrangement of the selected instruction succeeds. When arrangement succeeds, processing proceeds to step S126. When arrangement fails, processing proceeds to step S128.

[step S126] The second optimization unit 111c determines whether or not all the instructions in the input loop are arranged. When arrangement of all instructions is completed, processing proceeds to step S131. When any of the instructions is not arranged, processing proceeds to step S127.

[step S127] When all instructions are selected for the stage width and the number of MVEs of the current processing, the second optimization unit 111c shifts processing to step S128. When unselected instructions are present, the second optimization unit 111c selects one of the unselected instructions, and executes the processing in step S124 to S126.

[step S128] When arrangement of any of the instructions in the input loop fails for the stage width and the number of MVEs of the current processing, the second optimization unit 111c increases the number of MVEs, and executes the processing in step S123 to S127. When processing of all possible values of the number of MVEs is completed, processing proceeds to step S129.

[step S129] When the enough number of MVEs that are able to arrange all instructions in the input loop is absent for the stage width of the current processing, the second optimization unit 111c extends the stage width, and executes the processing in step S122 to S128. When the stage width has reached the upper limit, processing proceeds to step S130.

[step S130] When arrangement of all the instructions fails even when the stage width is extended to the upper limit, the second optimization unit 111c sets a return value indicating that scheduling (optimization) fails, and finishes the second software pipeline.

[step S131] When all the instructions are arranged, the second optimization unit 111c determines whether or not an instruction for register renaming is present. When the instruction for register renaming is present, processing proceeds to step S132. When the instruction for register renaming is absent, processing proceeds to step S133.

[step S132] The second optimization unit 111c performs register renaming on the instruction for register renaming, and performs unroll.

[step S133] The second optimization unit 111c sets a return value indicating that scheduling (optimization) succeeds, and outputs the scheduled instruction stream. Then, the second software pipeline is finished.

Next, instruction arrangement processing will be described in detail.

Figure 12:
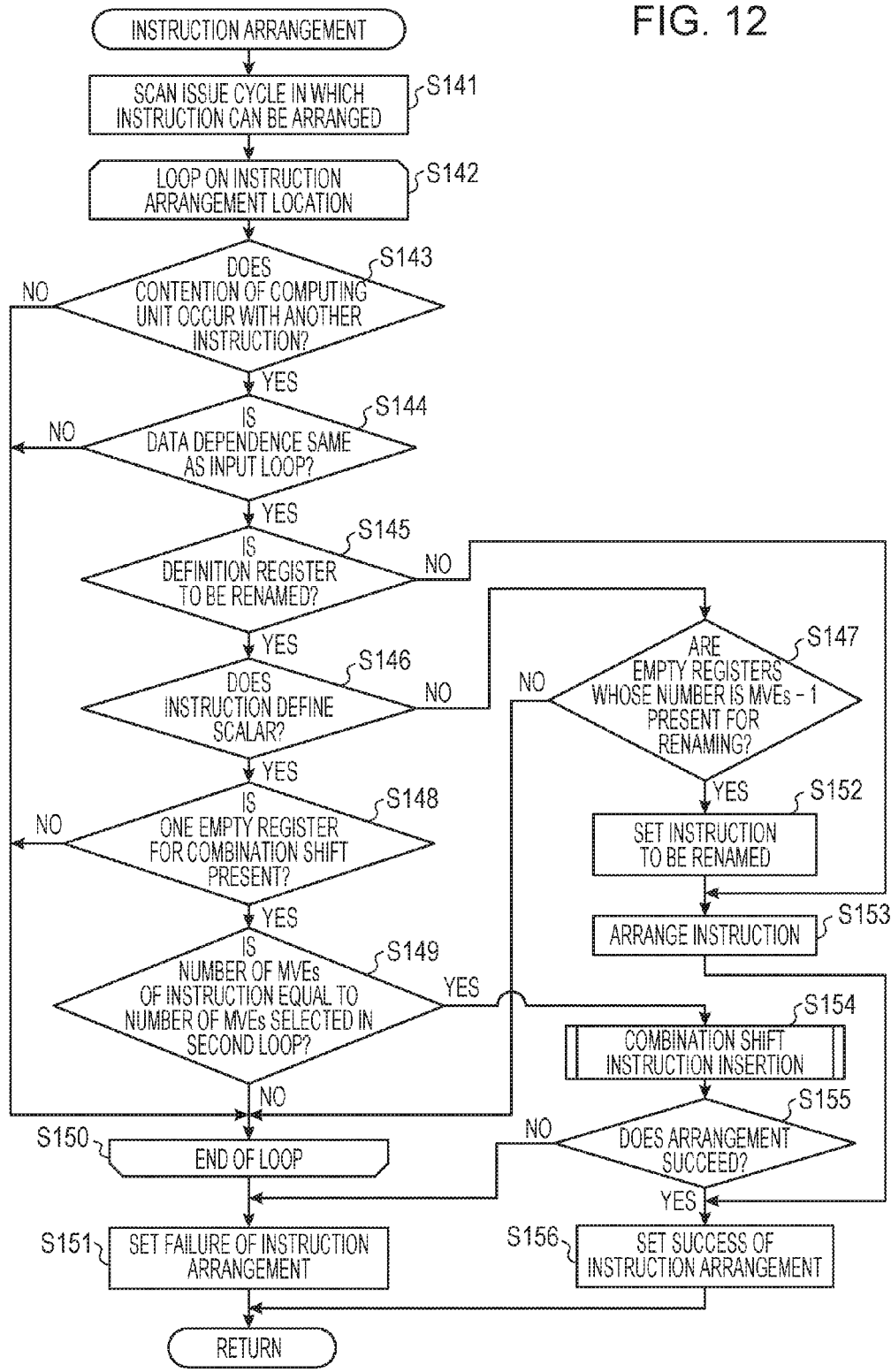
FIG. 12 is a diagram illustrating an example of an operational flowchart for instruction arrangement processing, according to an embodiment.

FIG. 12 is an operational flowchart illustrating an example of a procedure of the instruction arrangement processing.

[step S141] The second optimization unit 111c scans an issue cycle in which the selected instruction may be arranged. For example, the second optimization unit 111c identifies the issue cycle of the selected instruction, in which the selected instruction may be arranged, for example, based on the arrangement sequence of the selected instruction and other instructions in the input loop.

[step S142] The second optimization unit 111c performs loop processing in step S143 to S149 on the instruction arrangement location in the issue cycle in which the instruction may be arranged. In the loop on the instruction arrangement location, a location in which other instructions are not arranged is sequentially selected from among locations in which the instruction may be arranged.

[step S143] The second optimization unit 111c determines whether or not contention of a computing unit occurs between the selected instruction and any other instruction. Examples of the computing unit include ALU such as adder and multiplier, SIMD computing unit, and memory access unit. When the computing unit that executes the selected instruction is used to execute another instruction arranged in the same location as the selected location, it is determined that contention occurs. When the contention occurs, processing proceeds to step S150. When the contention does not occur, processing proceeds to step S144.

[step S144] The second optimization unit 111c determines whether or not data dependence is the same as the input loop. For example, when data acquired by executing the first instruction is referred according to the second instruction, the second instruction depends on the first instruction. In the case where the input loop has such dependence, when the second instruction is executed after the first instruction in the scheduled instruction arrangement, it is determined that data dependence is the same as the input loop. When data dependence is the same, processing proceeds to step S145. When data dependence is different from the input loop, processing proceeds to step S150.

[step S145] The second optimization unit 111c determines whether or not the pseudo register (definition register) defined in the selected instruction is to be renamed. For example, when data is loaded into the pseudo register used in another iteration according to the selected instruction as illustrated in FIG. 5, the definition register defined as load destination is to be renamed. When the pseudo register is to be renamed, processing proceeds to step S146. When the pseudo register is not to be renamed, processing proceeds to step S153.

[step S146] The second optimization unit 111c determines whether or not the selected instruction is an instruction that defines scalar. For example, when the instruction is not an instruction to process multiple pieces of data, like the SIMD extension instruction, but an instruction to process one piece of data, the instruction is determined as the instruction that defines scalar. When the instruction is the instruction that defines scalar, processing proceeds to step S148. When the instruction is not the instruction that defines scalar, processing proceeds to step S147.

[step S147] The second optimization unit 111c determines whether or not empty registers whose number is MVEs−1 are present for renaming. When enough empty registers are present, processing proceeds to step S152. When enough empty registers are not present, processing proceeds to step S150.

[step S148] The second optimization unit 111c determines whether or not one empty register for combination shift is present. When the empty register for combination shift is present, processing proceeds to step S149. When the empty register for combination shift is absent, processing proceeds to step S150.

[step S149] The second optimization unit 111c determines whether or not the number of MVEs of the instruction is the same as the number of MVEs selected in the second loop processing in step S122. When the number of MVEs matches, processing proceeds to step S154. When the number of MVEs does not match, processing proceeds to step S150.

[step S150] When arrangement of the instructions fails even when the processing in step S143 to S149 is applied to all locations in the cycle in which the instruction may be arranged, the second optimization unit 111c shifts processing to step S151. When there is an unprocessed location, the second optimization unit 111c selects one of the unselected locations, executes the processing in step S143 to S149.

[step S151] The second optimization unit 111c determines that the location where the selected instruction may be arranged is absent in the cycle in which the selected instruction may be arranged, sets a return value indicating that instruction arrangement fails, and finish the arrangement processing.

[step S152] The second optimization unit 111c sets the selected instruction as the instruction to be renamed.

[step S153] The second optimization unit 111c arranges the selected instructions in the selected locations. Then, processing proceeds to step S156.

[step S154] The second optimization unit 111c executes insertion processing of the combination shift instruction. Details of the processing will be described later (See FIG. 13).

[step S155] The second optimization unit 111c determines whether or not arrangement of the selected instruction and the combination shift instruction succeeds. When arrangement succeeds, processing proceeds to step S156. When arrangement fails, processing proceeds to step S151.

[step S156] The second optimization unit 111c sets a return value indicating that arrangement of the instructions succeeds, and finishes arrangement processing.

Next, combination shift instruction insertion processing will be described in detail.

Figure 13:
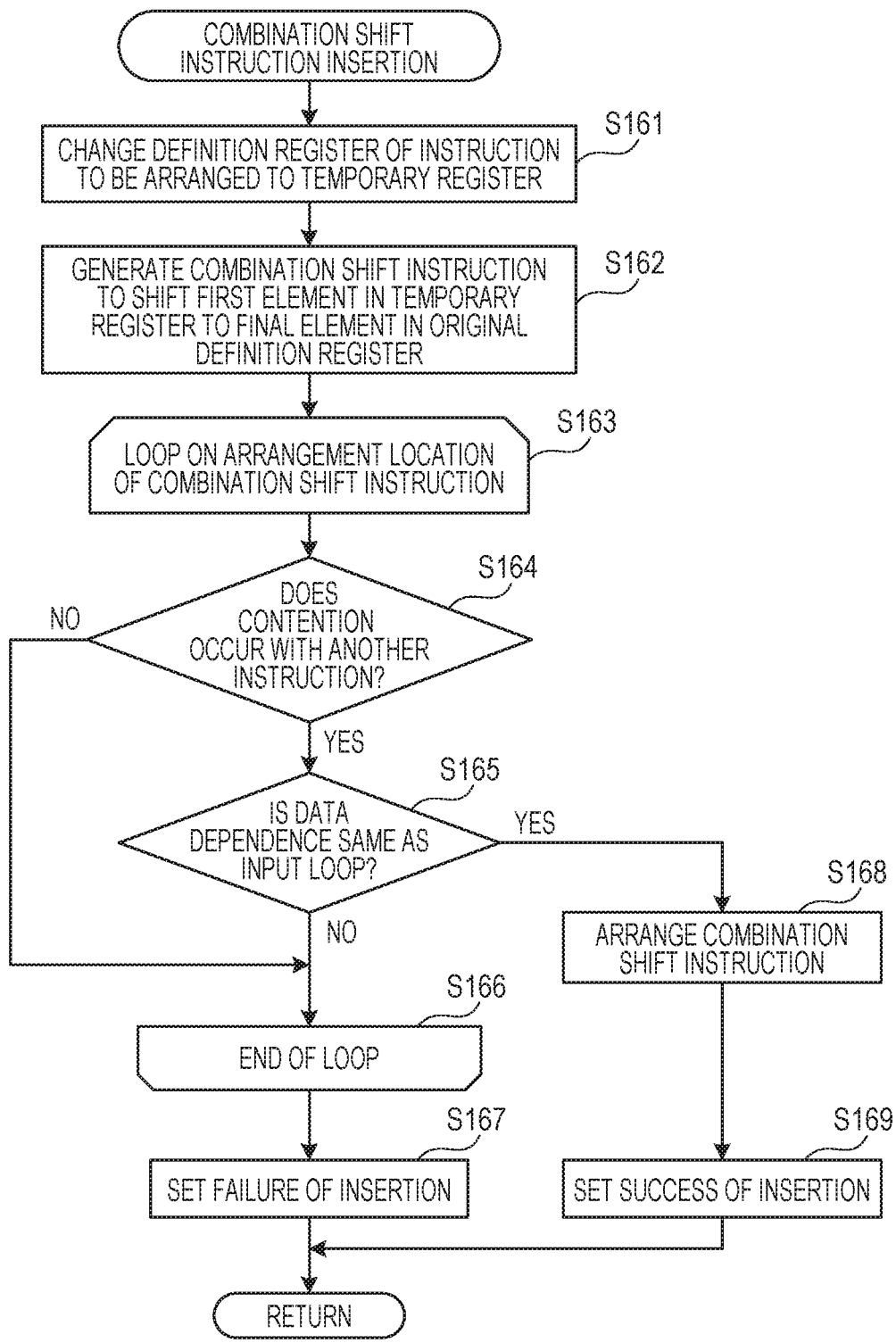
FIG. 13 is a diagram illustrating an example of an operational flowchart for combination shift instruction insertion processing, according to an embodiment.

FIG. 13 is an operational flowchart illustrating an example of a procedure of the combination shift instruction insertion processing.

[step S161] The second optimization unit 111c arrange a definition register defined in the instruction to be arranged, by changing the definition of the definition register to that of a temporary register. The temporary register is a pseudo register that temporarily store loaded data.

[step S162] The second optimization unit 111c generates a combination shift instruction to shift a first element in the temporary register to a last element in the original definition register.

[step S163] The second optimization unit 111c performs the loop processing in steps S164 to S165 on arrangement of the combination shift instruction. In this loop processing, locations where the combination shift instruction may be arranged is sequentially selected.

[step S164] When the combination shift instruction is arranged in the selected location, the second optimization unit 111c determines whether or not contention of a computing unit occurs between the instruction and another instruction. When no contention occurs, processing proceeds to step S165. When the contention occurs, processing proceeds to step S166.

[step S165] The second optimization unit 111c determines whether or not data dependence is the same as the input loop. When data dependence is the same as the input loop, processing proceeds to step S168. When data dependence is different from the input loop, processing proceeds to step S166.

[step S166] In the case where the combination shift instruction is not arranged even when the processing in step S164 to S165 is applied to all the locations, the second optimization unit 111c shifts processing to step S167. When unprocessed locations are present, the second optimization unit 111c selects one of the unselected locations and executes the processing in step S164 to S165.

[step S167] The second optimization unit 111c sets a return value indicating that insertion of the combination shift instruction fails, and finishes the combination shift instruction insertion processing.

[step S168] The second optimization unit 111c arranges the combination shift instruction in the selected location.

[step S169] The second optimization unit 111c sets a return value indicating that insertion of the combination shift instruction succeeds, and finishes the combination shift instruction insertion processing.

In this manner, optimization by software pipeline is performed. A specific example of optimization will be described below.

Figure 14:
FIG. 14 is a diagram illustrating an example of software-pipelined loop processing, according to an embodiment.

FIG. 14 is a view illustrating an example of software-pipelined loop processing. In FIG. 14, an input loop 71 extracted from the source file is converted into an instruction stream 72 according to ISA. In FIG. 14, instructions are described in pseudo instructions. Software pipeline depends on CPU micro-architecture. Accordingly, the pipelining unit 111 previously holds CPU internal pipeline structure and information on resources for computing units.

A first line "move r0, #0" in the converted instruction stream 72 is an instruction to initialize a register "r0" that stores a variable holding a sum computation result, that is a sum, at 0. A second line "addr r2, a" is an instruction to acquire a head address of an array a, and to store the head address in a register "r2". A third line "add r3, a, 400" is an instruction to calculate an array address indicating an end value of an index, and to store the array address in a register "r3".

A first line "load r4, [r2]" in the loop is an instruction to load data from an area corresponding to the address in the register "r2", and to store the value of the loaded data in a register "r4". A second line "add r0, r4" is an instruction to store a sum of the value in the register "r4" and the value in the register "r0" in the register "r0". A third line "add r2, 4" is an instruction to advance the array address set in the register "r2" by "4". A fourth line "brne LOOP, r2, r3" is an instruction to iterate the loop until the value in the register "r2" matches the value in the register "r3".

First, the case where the loop processing is software pipelined without using the combination shift instruction will be described.

FIG. 15 is a view illustrating an instruction stream after the first software pipeline. When optimization is performed by software pipeline without using the combination shift instruction, an instruction stream 73 as illustrated in FIG. 15 is outputted.

First and second lines are the same as those in the instruction stream 72 in FIG. 14. A third line "add r3', a, 396" is an instruction to calculate an array address indicating an end value of an index, and to store the address in a register "r3'". Due to deformation of the loop, the end value of the index is different from the end value in the fourth line of the instruction in the instruction stream 72 illustrated in FIG. 14.

An instruction "load r4', [r2]" in the optimization preprocessing is an instruction generated by register renaming from the register "r4" to a register "r4'". According to this instruction, data is loaded from an area corresponding to an address in the register "r2", and a value of the loaded data is stored in the register "r4'".

A first line "add r2, 4" in the loop is an instruction to advance an array address set in the register "r2" by "4". A second line "load r4, [r2]" is an instruction to load data from the area corresponding to the address in the register "r2", and store a value of the loaded data in the register "r4". A third line "add r0, r4'" is an instruction to store a sum of the value in the register "r4'" and the value in the register "r0" in the register "r0". A fourth line "add r2, 4" is an instruction to advance an array address set in the register "r2" by "4". A fifth line "load r4', [r2]" is an instruction to load data from an area corresponding to the address in the register "r2", and to store the value of the loaded data in the register "r4'". A sixth line "add r0, r4" is an instruction to store a sum of the value in the register "r4" and the value in the register "r0" in the register "r0". A seventh line "brne LOOP, r2, r3'" is an instruction to iterate the loop until the value in the register "r2" matches the value in the register "r3'".

The three lines of instructions in the optimization postprocessing are the same as the first to third lines in the loop processing.

In the instruction stream 73, unroll called MVE is performed in the loop processing. Thus, two input loops becomes one loop after optimization. In the second line instruction in the loop, the register "r4" and the register "r4'" coexists. That is, the value in the register "r4" may not be held without renaming.

Owing to instruction scheduling for the first software pipeline, data in the next iteration may be loaded during the previous iteration.

Next, a specific example of software pipeline will be described using the combination shift instruction.

FIG. 16 is a view illustrating an instruction stream of the second software pipeline. When optimization is performed by software pipeline using the combination shift instruction, an instruction stream 74 as illustrated in FIG. 16 is outputted.

First and second lines are the same as those in the instruction stream 72 in FIG. 14. A third lie "add r3', a, 400" is an instruction to calculate an array address indicating an end value of an index, and to store the address in a register "r3'".

The first line "load rtmp, [r2]" in the optimization preprocessing is an instruction to load data from an area corresponding to an address in the register "r2", and to store the value of the loaded data in a head element in the register "rtmp". The second line "ecsl r4, rtmp, 2" is a combination shift instruction to combine the register "rtmp" with the rear of the register "r4" and to shift data to left by two elements. A third line instruction "add r2, 4" is an instruction to advance the array address set in the register "r2" by "4". Since the head element in the register "r4" has no data, the instruction "add r0, r4" is not executed before the next combination shift instruction, and in the fourth and fifth line instructions which are the same as the first and second lines instructions are executed. According to a fourth line instruction, next data is stored in the head element in the register "rtmp". According to a fifth line instruction, the data according to the instruction of the first line is moved to the head element in the register "r4".

A first line "add r0, r4" in the loop is an instruction to store a sum of a value of the register "r4" and a value of the register "r0" in the register "r0". A second line instruction "add r2, 4" is an instruction to advance the array address set in the register "r2" by "4". Third and fourth line instructions are the same as the first and second line instructions in the optimization preprocessing. A fifth line instruction "brne LOOP, r2, r3'" is an instruction to iterate the loop until the value in the register "r2" matches the value in the register "r3'".

First and second lines instructions in the optimization postprocessing are the same as the first and second line instructions in the loop. Here, the value loaded in the last iteration is present in the element having the element number "3" in the register "r4". Thus, the third line load instruction in the loop is not executed, and the third line combination shift instruction is executed. A third line "ecsl r4, r4, 2" is a combination shift instruction to combine the register "r4" with the rear of the register "r4" and to shift data to left by two elements. A fourth line "add r0, r4" is an instruction to store a sum of the value in the register "r4" and the value in the register "r0" in the register "r0".

When such optimization is performed, renaming and unroll by MVE do not have to be performed. In addition, the register pressure may be reduced. The object size may also be reduced.

FIG. 14 to FIG. 16 illustrates the example in the case of the number of MVEs=2. In the second software pipeline, since the temporary register "rtmp" is used instead of performing register renaming, the number of registers to be used in the case of the number of MVEs=2 remains unchanged. In the case of the number of MVEs=4, the number of registers to be used decreases.

FIG. 17 is a view illustrating a case where the number of MVEs=4. As illustrated in FIG. 17, when a value loaded in a first stage (S1) is used in add in a fourth stage, the number of MVEs is 4.

In the case where the number of MVEs=4, due to renaming of the register "r4" defined in the input loop, the live ranges of the registers overlap by four iterations. Thus, the first software pipeline uses the registers "r4'", "r4''", "r4'''". On the contrary, in the second software pipeline, optimization by pipeline may be achieved by merely using the temporary register "rtmp". Accordingly, although the number of the registers to be used increases by one for the temporary register, three renamed registers may be omitted.

FIG. 18 is a view illustrating an instruction stream after the second software pipeline in the case where the number of MVEs=4. In the case where the number of MVEs=4, when optimization is performed by software pipeline using the combination shift instruction, an instruction stream 75 as illustrated in FIG. 18 is outputted. First to third lines are the same as the first to third lines of the instruction stream 74 illustrated in FIG. 16. A first line in the optimization preprocessing is the same as the first line in the instruction stream 74 in the optimization preprocessing illustrated in FIG. 16.

A second line "ecsl r4, rtmp, 1" in the optimization preprocessing is a combination shift instruction to combine the register "rtmp" with the rear of the register "r4", and to shift data to left by one element. In this manner, in the case where the number of MVEs=4, shift amount is "1". Thereby, the value loaded into the register "rtmp" is moved to the head element in the register "r4" according to four combination shift instructions. A third line instruction "add r2, 4" is an instruction to advance the array address set in the register "r2" by "4". Fourth and fifth lines are the same as those in the first and second lines in the optimization preprocessing. After that, the same instructions as those in the third to fifth lines are iterated twice.

Upon termination of the optimization preprocessing, data read in each of four load instructions is stored in each of the elements having the element number "1" to "4" in the register "r4".

The instructions in the loop are the same as the instructions in the instruction stream in the loop in FIG. 16 except that the shift amount of the combination shift instruction is "1".

First and second lines in the optimization postprocessing are the same as the first and second lines in the instruction stream 74 in the postprocessing after optimization in FIG. 16. A third line "ecsl r4, rtmp, 1" is a combination shift instruction to combine the register "rtmp" with the rear of the register "r4", and to shift data to left by one element. A fourth line "add r0, r4" is an instruction to store the value in the register "r4" and the value in the register "r0" in the register "r0". After that, the same instructions as those in the second to fourth lines are iterated twice.

As described above, even in the case where the number of MVEs=4, software pipeline may be performed by using one temporary register "rtmp" in addition to the registers defined in the input loop. This may reduce the number of registers to be used in software pipeline.

Although the embodiments have been described, each component in the embodiments may be replaced with another component having the same function. Any other suitable structure and step may be added. Any two or more structures (features) in the embodiments may be combined with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
a memory configured to store a program including a description of loop processing of iterating a plurality of instructions; and
a processor coupled to the memory, configured to:
rearrange an execution sequence of the plurality of instructions in the program such that the loop processing is pipelined by software pipeline,
set a first register as a load destination of data in a load instruction of the plurality of instructions, and
insert a shift instruction to shift a data row in a storage area to left, into the description of the loop processing in the program, the data row being acquired by combining the first register with a right side of a second register for single instruction multiple data (SIMD) extension instruction,
wherein, for each of a plurality of iterations of the pipelined loop processing, the processor
loads data into the first register according to the load instruction, and
shifts the data row in the storage area acquired by combining the first register with the right side of the second register to left according to the shift instruction, and
wherein after each of the plurality of iterations of the pipelined loop processing is performed, the processor refers to data at a head of the second register.

2. The apparatus of claim 1, wherein
in a case where a number of pieces of data simultaneously held as a result of pipelining is N where N is an integer of 2 or more, the processor sets a shift amount per shift instruction such that data loaded into the first register moves to the head of the second register by N shifts.

3. The apparatus of claim 1, wherein
the processor determines whether a same number of registers as a number of pieces of data that are simultaneously held are available when the software pipeline is achieved by register renaming, and
when insufficient number of registers are available, the processor performs the setting of the first register as the load destination of data in the load instruction, and the inserting of the shift instruction.

4. A method comprising:
providing, by a processor, a program including a description of loop processing of iterating a plurality of instructions;
rearranging, by the processor, an execution sequence of the plurality of instructions such that the loop processing is pipelined by software pipeline;

setting, by the processor, a first register as a load destination of data in a load instruction of the plurality of instructions;

inserting, by the processor, a shift instruction to shift a data row in a storage area to left, into the description of the loop processing in the program, the data row being acquired by combining the first register with a right side of a second register for single instruction multiple data SIMD extension instruction;

for each of a plurality of iterations of the pipelined loop processing, loading, by the processor, data into the first register according to the load instruction and shifting the data row in the storage area acquired by combining the first register with the right side of the second register to left according to the shift instruction; and after each of the plurality of iterations of the pipelined loop processing is performed, referring, by the processor, to data at a head of the second register.

5. A non-transitory, computer-readable recording medium having stored therein a program causing a computer to execute a process:

providing a program including a description of loop processing of iterating a plurality of instructions;

rearranging an execution sequence of the plurality of instructions such that the loop processing is pipelined by software pipeline;

setting a first register as a load destination of data in a load instruction of the plurality of instructions;

inserting a shift instruction to shift a data row in a storage area to left, into the description of the loop processing in the program, the data row being acquired by combining the first register with a right side of a second register for single instruction multiple data SIMD extension instruction;

for each of a plurality of iterations of the pipelined loop processing, loading data into the first register according to the load instruction and shifting the data row in the storage area acquired by combining the first register with the right side of the second register to left according to the shift instruction; and after each of the plurality of iterations of the pipelined loop processing is performed, referring to data at a head of the second register.

6. A non-transitory, computer-readable recording medium having stored therein a program causing a computer to execute a process:

providing a program including a description of loop processing of iterating a plurality of instructions;

executing pipelined loop processing of iterating the plurality of instructions by software pipeline;

setting a first register as a load destination of data in a load instruction of the plurality of instructions;

inserting a shift instruction to shift a data row in a storage area to left, into the description of the loop processing in the program, the data row being acquired by combining the first register with a right side of a second register for single instruction multiple data SIMD extension instruction;

in each iteration of the pipelined loop processing, loading data into the first register according to the load instruction and shifting the data row in the storage area acquired by combining the first register with the right side of the second register to left according to the shift instruction; and after each of the plurality of iterations of the pipelined loop processing is performed, referring to data at a head of the second register.

* * * * *